United States Patent
Onuma et al.

(10) Patent No.: US 7,610,593 B2
(45) Date of Patent: Oct. 27, 2009

(54) THIN STRUCTURED SLOT-IN TYPE OPTICAL DISK APPARATUS

(75) Inventors: Hideyuki Onuma, Hokota (JP); Seiji Hamaie, Ebina (JP); Sojiro Kirihara, Kawasaki (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 643 days.

(21) Appl. No.: 11/216,053

(22) Filed: Sep. 1, 2005

(65) Prior Publication Data
US 2006/0190954 A1 Aug. 24, 2006

(30) Foreign Application Priority Data
Feb. 22, 2005 (JP) ............................. 2005-045609

(51) Int. Cl.
G11B 7/00 (2006.01)
(52) U.S. Cl. .................................................... 720/690
(58) Field of Classification Search ................ 720/676, 720/690, 691
See application file for complete search history.

(56) References Cited

U.S. PATENT DOCUMENTS

| 4,654,840 A | * | 3/1987 | Takahashi | .................. | 720/605 |
| 2005/0283789 A1 | * | 12/2005 | Iwaasa | ....................... | 720/690 |

FOREIGN PATENT DOCUMENTS

| JP | 11-297007 | | 10/1999 |
| JP | 2000011511 A | * | 1/2000 |
| JP | 2000339880 A | * | 12/2000 |
| JP | 2002-074800 | | 3/2002 |
| JP | 2002-352498 | | 12/2002 |
| JP | 2003-030862 | | 1/2003 |

* cited by examiner

*Primary Examiner*—David D Davis
(74) *Attorney, Agent, or Firm*—Antonelli, Terry, Stout & Kraus, LLP.

(57) ABSTRACT

In an optical disk apparatus, a feed motor for moving an optical pickup in approximately the radial direction of a disk is provided on a base, such as unit mechanism mounting member, that pivotally moves about a supporting point together with the optical pickup and a disk motor, and on the base, the feed motor is disposed at an outer circumferential position of the optical disk or at a position near the supporting point, in the projection region of the optical disk in its chucked condition.

10 Claims, 6 Drawing Sheets

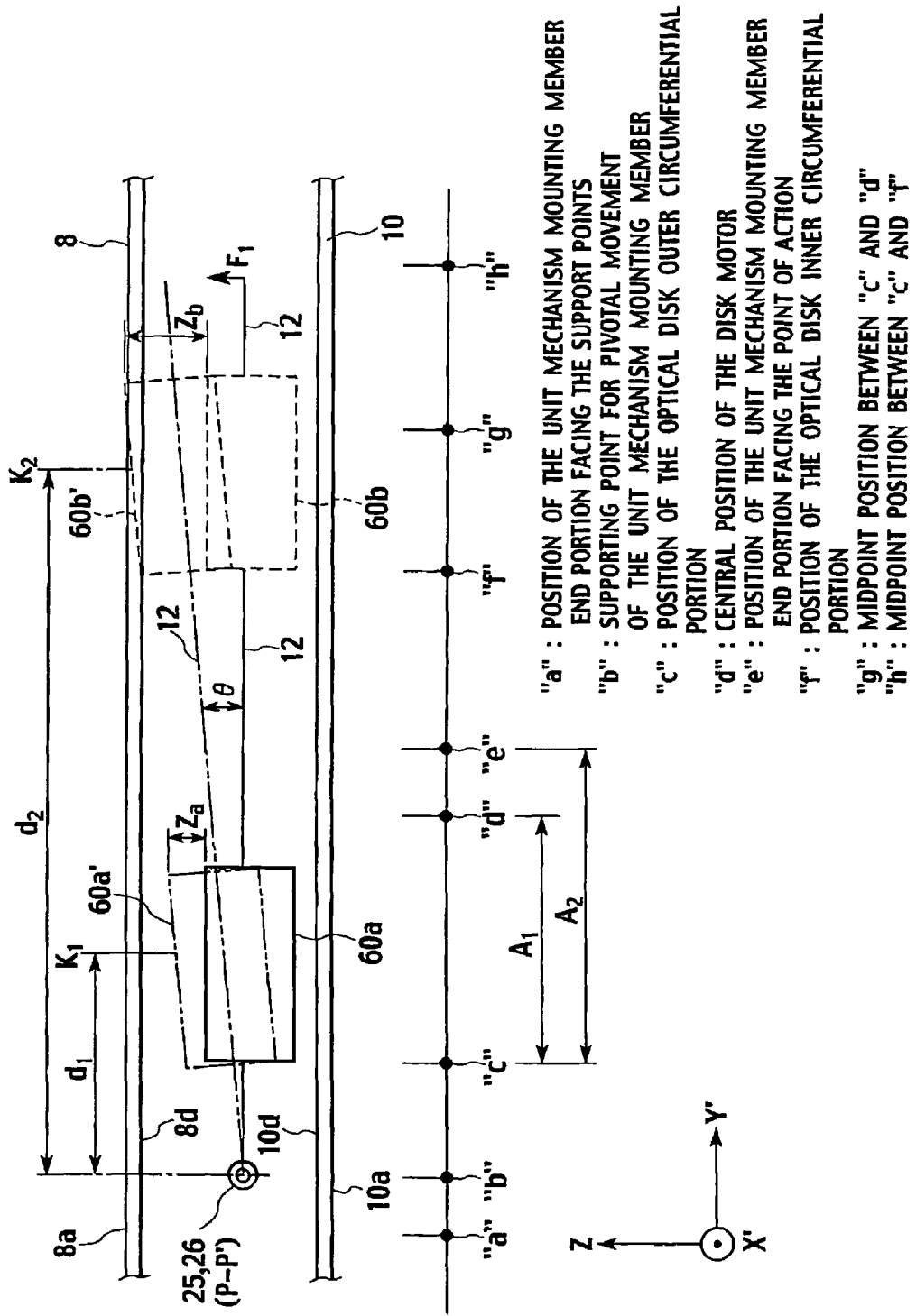

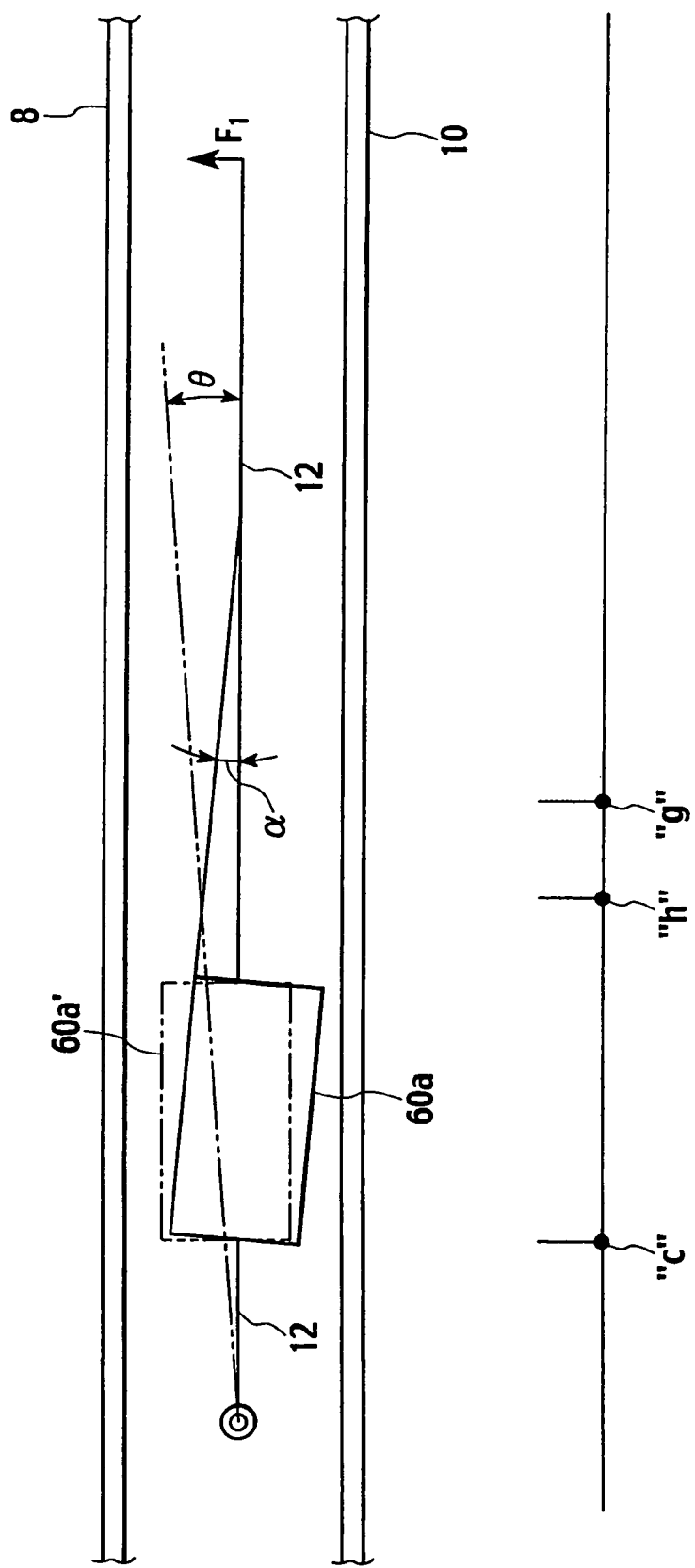

THIN STRUCTURED SLOT-IN TYPE OPTICAL DISK APPARATUS

CLAIM OF PRIORITY

The present application claims priority from Japanese application serial No. P2005-045609, filed on Feb. 22, 2005, the content of which is hereby incorporated by reference into this application.

BACKGROUND OF THE INVENTION

1. Technical Field of the Invention

The present invention relates to optical disk apparatuses that write information onto or read it out from optical disks, and more particularly, to a technique for reducing the apparatuses in thickness.

2. Description of the Related Art

Conventional techniques associated with the present invention include those described in, for example, Japanese Patent Laid-open Nos. 2002-352498, 2002-74800, 11-297007, and 2003-30862. Japanese Patent Laid-open No. 2002-352498 describes a configuration in which the driving means including the driving motor (feed motor) that moves a pickup (optical pickup) is disposed at approximately a midpoint position in the radial direction of a chucked disk (optical disk). Japanese Patent Laid-open Nos. 2002-74800 and 11-297007 describe configurations in which a feed motor for moving an optical pickup is disposed externally to the outer circumferential section of an optical disk. Japanese Patent Laid-open No. 2003-30862 describes a configuration in which a stepping motor (feed motor) for moving an optical pickup is disposed internally to a midpoint position in the radial direction of an optical disk.

However, for the techniques described in, for example, Japanese Patent Laid-open Nos. 2002-352498 and 2003-30862, since the amount of displacement of a traverse during its movement at the position where the driving means or the stepping motor is disposed increases significantly during disk chucking, the disk apparatus requires height large enough to accommodate the increase, with the result that dimensional reduction of the apparatus, especially, reduction in its thickness could be impeded. Also, for the techniques described in Japanese Patent Laid-Open Nos. 2002-74800 and 11-297007, the configuration with the feed motor disposed outside the projection region of the disk implies that the plane dimensions of the apparatus are prone to increase and thus that dimensional reduction of the apparatus, especially, reduction of its thickness may be difficult to achieve.

The present invention has been made with the situations of the above conventional techniques taken into consideration, and the invention is intended to make it possible to provide, for instance, among all slot-in types of optical disk apparatuses, i.e., the types that allow direct loading of a disk as a recording medium into the apparatus without using a tray, a casing, or the like, particularly an optical disk apparatus of the slim slot type or the like, wherein increases in plane dimensions of the optical disk apparatus are suppressed for dimensional reduction of the apparatus, especially, for further reduction of its thickness to $9.5 \times 10^{-3}$ m or less, for example.

SUMMARY OF THE INVENTION

The present invention is an optical disk apparatus that solves problems associated with the conventional techniques.

More specifically, in the optical disk apparatus of the present invention, a feed motor for drivingly rotating an optical-pickup-moving lead screw member is provided on a base which pivotally moves around a supporting point together with an optical pickup and a disk motor, and on this base, the feed motor is disposed externally to a midpoint position in a radial direction of a chucked optical disk, in a projection region of the disk, namely, in the region where the optical disk creates a shadow thereof when orthogonally projected in a direction vertical to a disk plane. That is to say, a position at a distance about half a radial length of a body of the feed motor during its pivotal movement exists externally to the midpoint position in the radial direction of the optical disk. Also, the base is adapted to pivotally move about the supporting point provided at a position external to the midpoint position in the radial direction of the chucked optical disk, and the feed motor for drivingly rotating the lead screw member is disposed at a position closer to the above-mentioned supporting point than to the midpoint position in the radial direction of the optical disk, in the projection region of the disk. In short, the position at a distance about half the radial length of the feed motor body during its pivotal movement exists at a position closer to the above-mentioned supporting point than to the midpoint position in the radial direction of the optical disk. In addition, a front edge of a convex-shaped damper which, when the optical disk is chucked, is inserted into a central hole of the optical disk to support the disk in a radial direction thereof in an abutting state thereof with respect to an opposite face of a top cover, is adapted to protrude from a through-hole in the top cover and to be positioned above, in the disk projection region, than a planar section of the top cover.

According to the present invention, an optical disk apparatus of the slot-in type or the like, can be dimensionally reduced, especially, further reduced in thickness.

BRIEF DESCRIPTION OF THE DRAWINGS

FIG. 5 is an explanatory diagram of the amount of displacement of a feed motor during disk chucking in the optical disk apparatus of FIG. 1; and FIG. 6 is an explanatory diagram of the feed motor when it is inclined with respect to the unit mechanism mounting member.

DETAILED DESCRIPTION OF THE PREFERRED EMBODIMENT

An embodiment of the present invention will be described below using the accompanying drawings.

Figure 1:
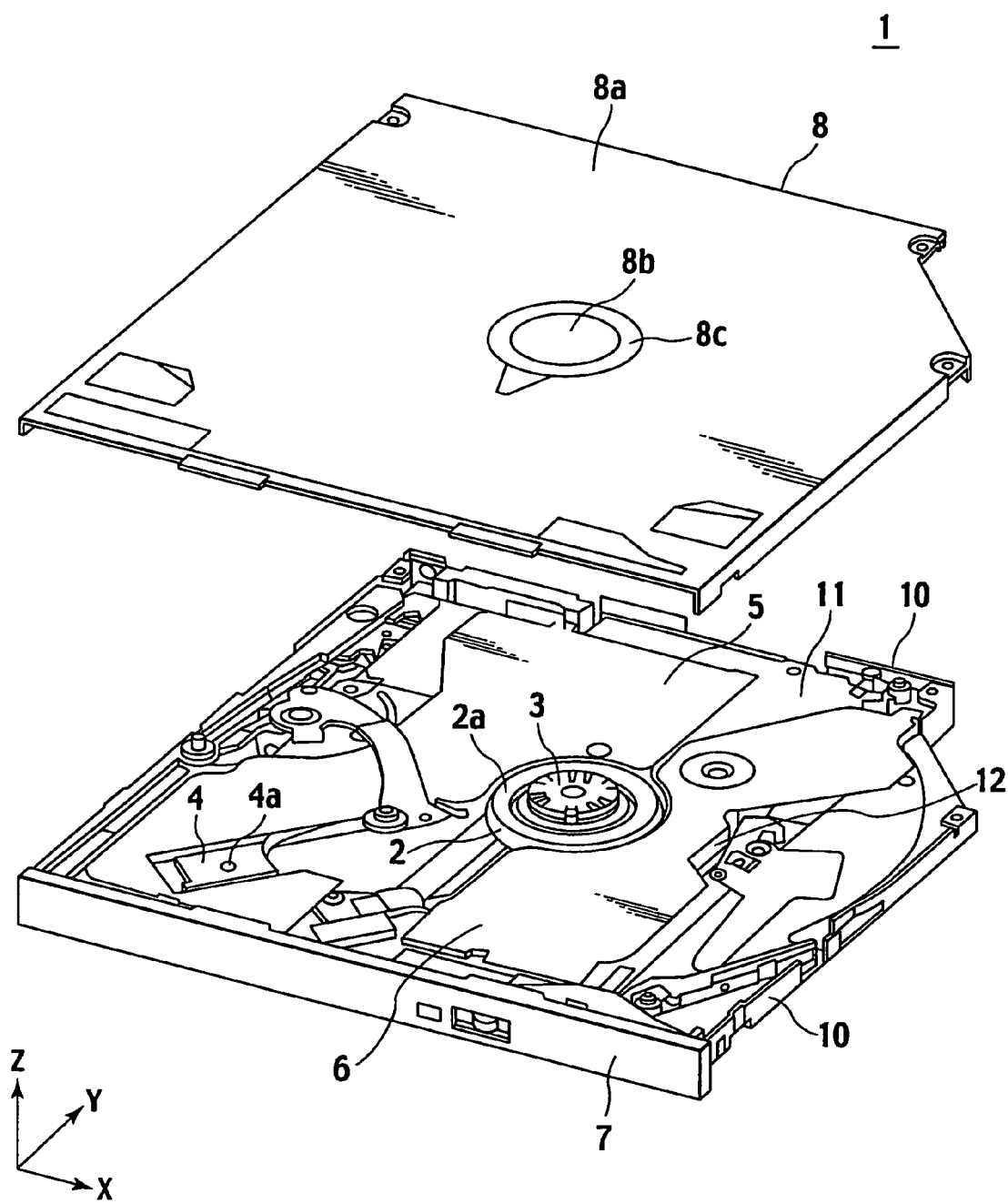
FIG. 1 is a perspective view of an optical disk apparatus with its top cover removed according to an embodiment of the present invention.
Figure 2:
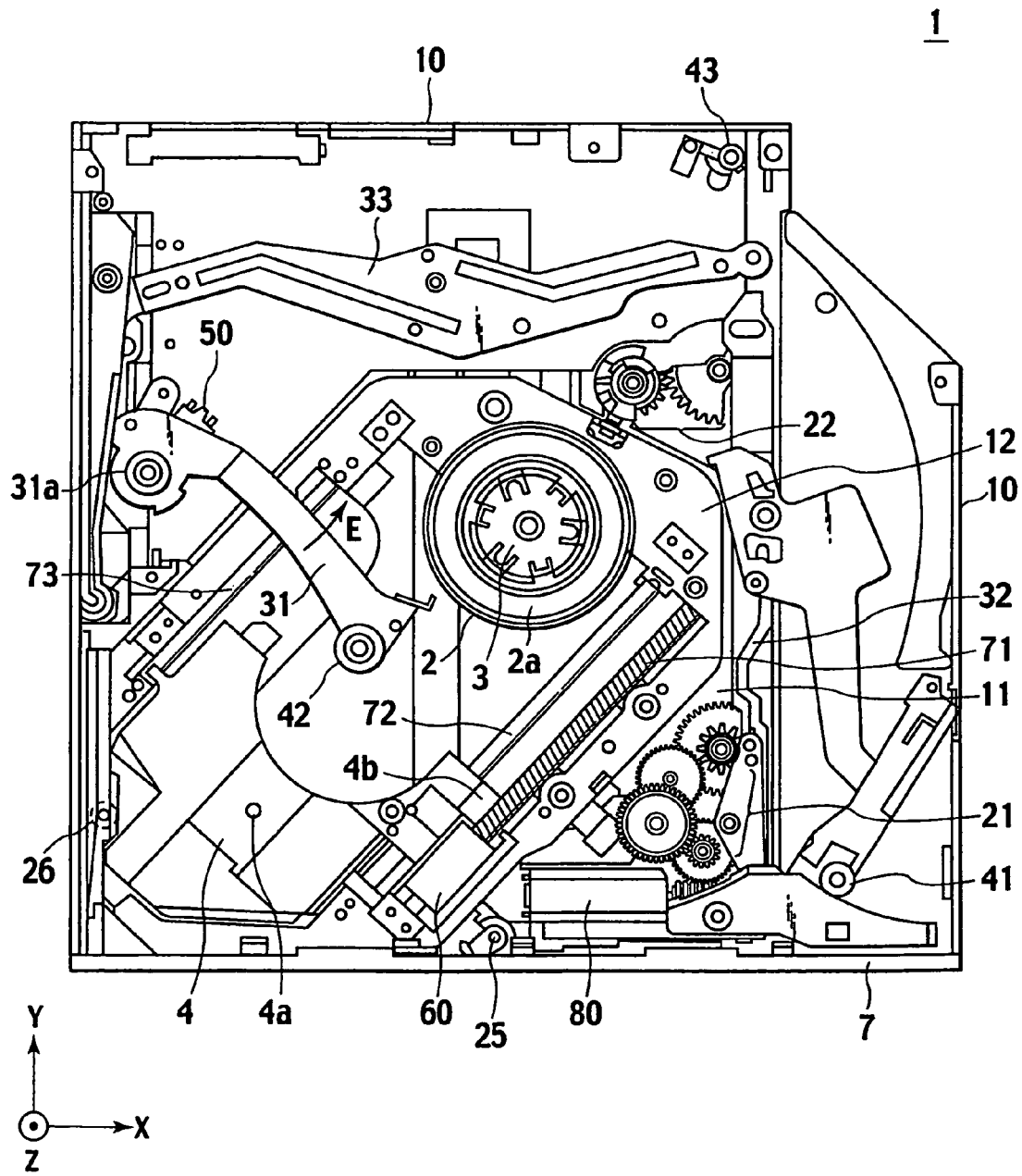
FIG. 2 is a plan view of an internal structure of the optical disk apparatus shown in FIG. 1.
Figure 3:
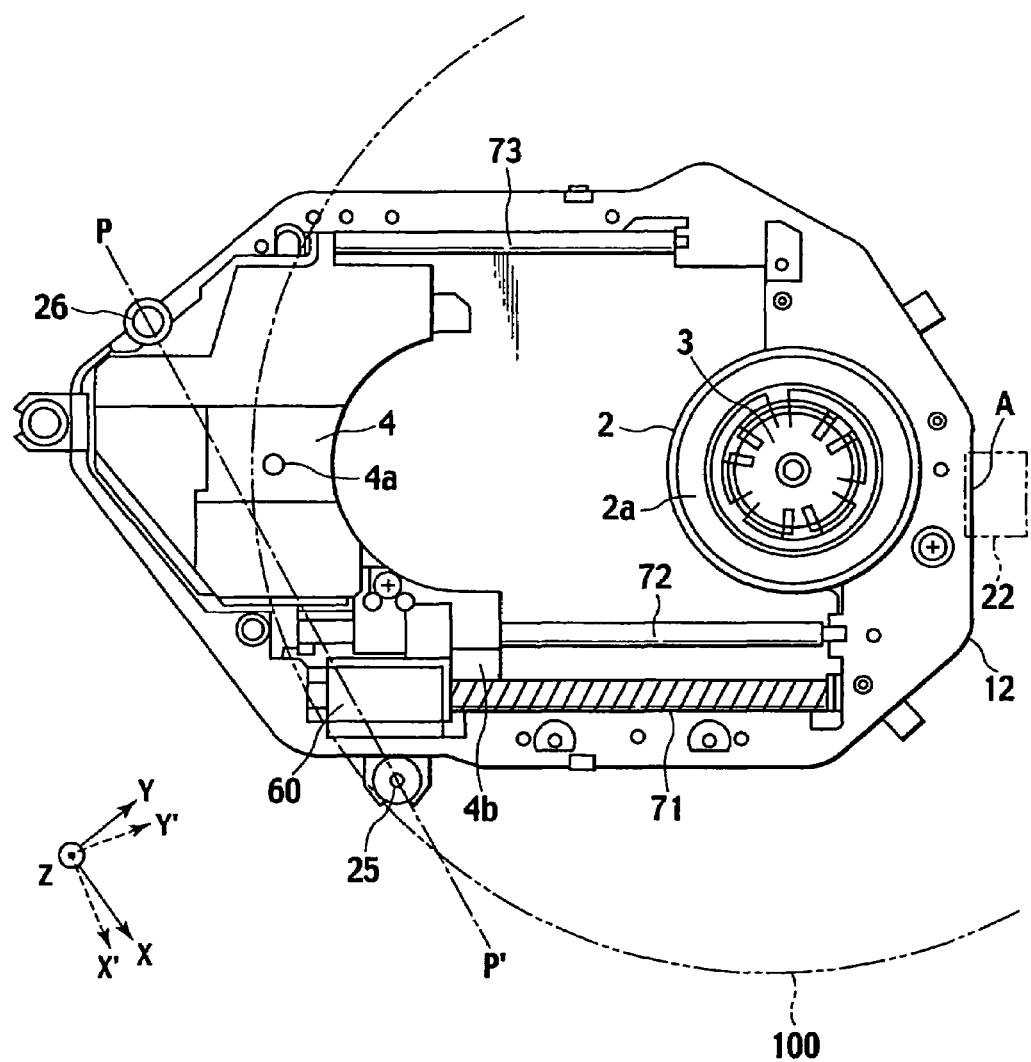
FIG. 3 is a plan view showing the constituent elements of the optical disk apparatus of FIG. 1 that are arranged on a unit mechanism mounting member.
Figure 4:
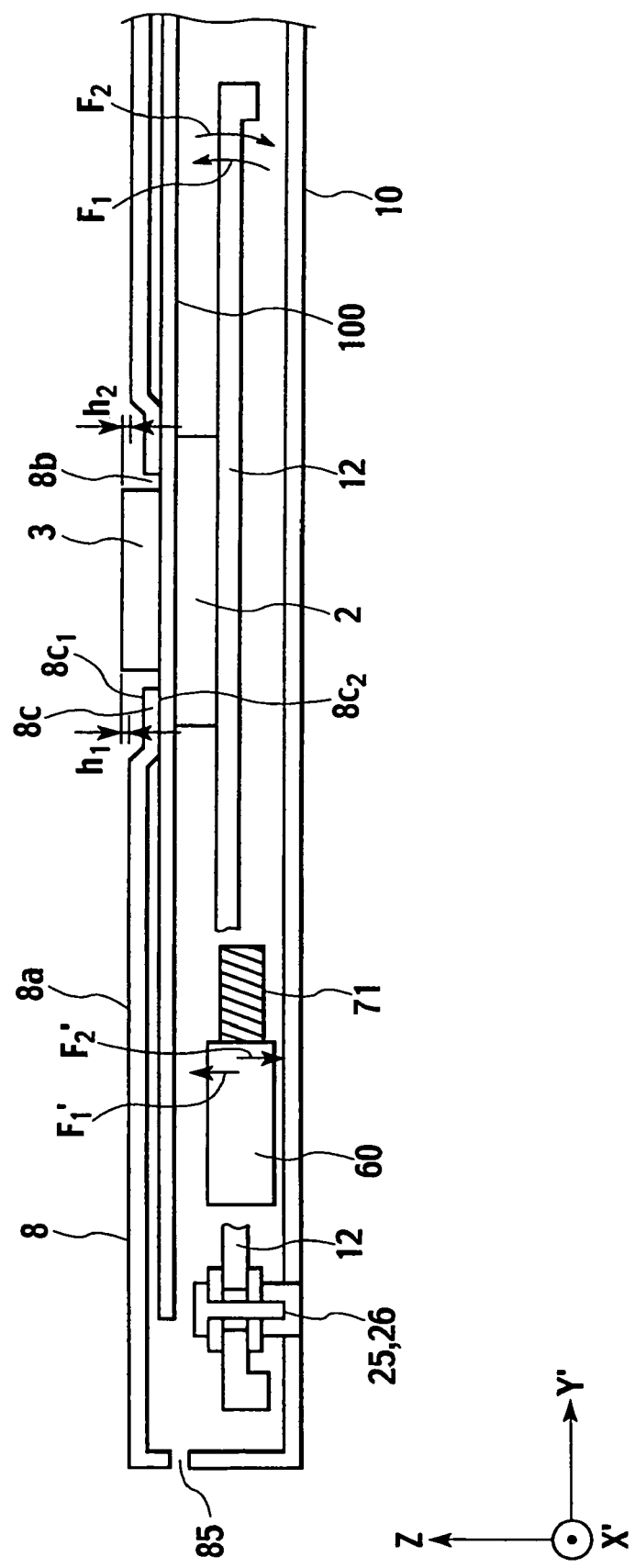
FIG. 4 is an explanatory diagram of disk chucking in the optical disk apparatus of FIG. 1.

FIGS. 1 to 5 are explanatory diagrams of an embodiment of the present invention. FIG. 1 is a perspective view of an optical disk apparatus with its top cover removed according to an embodiment of the present invention, showing a structural example of a slot-in type thereof. FIG. 2 is a plan view of an internal structure of the optical disk apparatus shown in FIG. 1, and FIG. 3 is a plan view showing the constituent elements of the optical disk apparatus of FIG. 1 that are arranged on a unit mechanism mounting member. FIG. 4 is an explanatory diagram of disk chucking in the optical disk apparatus of FIG. 1, and FIG. 5 is an explanatory diagram of the amount of displacement of a feed motor during disk chucking in the optical disk apparatus of FIG. 1.

In FIG. 1, reference number 1 denotes the optical disk apparatus, 2 a disk motor for rotating an optical disk (not shown), and 3 a damper disposed at top of a rotating section of the disk motor 2 and having a convex-shaped constituent element which, when the optical disk is chucked, is inserted into a central hole of the optical disk and supports the disk. Reference number 2a denotes a disk plane support section disposed concentrically with the damper 3, at top of the rotating section of the disk motor 2, in order to support a planar section (planar section on the reading or writing side) provided around the central hole in the optical disk with the damper 3 inserted within the central hole of the disk. Reference number 4 is an optical pickup that writes and/or reads information by irradiating a recording surface of the optical disk with a laser beam, and 4a is an objective lens. Reference numbers 5 and 6 are both an internal cover that covers a surrounding wide region within the apparatus, such as the disk motor 2, damper 2, and disk plane support section 2a, and provides spatial interception, in that region, between the planar section of the optical disk and components/mechanism of the apparatus. Reference number 7 is a front panel of the optical disk apparatus 1, and 8 is a top cover disposed above the damper 3 and facing the surface of the optical disk apparatus 1 to cover this apparatus. Reference number 8a is an outside planar section (outer planar section) of the top cover 8, 8b a through-hole provided at an opposite position to the damper 3, on the surface of the top cover 8, and 8c a recess provided around the through-hole 8b. Reference number 10 is a bottom cover disposed on the reverse side of the optical disk apparatus 1 to cover the apparatus, 11 a first base forming a base of the apparatus and coupled with the bottom cover 10, and 12 a unit mechanism mounting member as a second base on which are installed the disk motor 2, the damper 3, the disk plane support section 2a, the optical pickup 4, and other elements. The optical pickup 4 with the objective lens 4a mounted thereon is moved in approximately a radial direction with respect to the optical disk in its chucked condition, by a lead screw member (not shown) drivingly rotated about its axis by a feed motor (not shown).

In FIG. 2, reference number 71 is a lead screw member having a feed screw on the surface and rotating to assign approximately radial moving force of the optical disk in a direction of the optical pickup 4, and 60 is a feed motor, such as a stepping motor, that has a motor-rotating shaft directly coupled with the lead screw member 71 to drivingly rotate the member 71. Reference numbers 72, 73 are guide members for guiding an approximately radial movement of the optical pickup 4, on both sides of the pickup 4, and 4b is a rack with a front end engaged with the feed screw of the lead screw member 71 in order to transmit rotating force thereof to the optical pickup 4 as linear moving force. Reference numbers 31, 32, 33 are levers which, when the optical disk is loaded from the front panel 7 into the apparatus and when the optical disk within the apparatus is unloaded toward the front panel 7, transmit driving force for the load/unloading of the disk. Reference number 31a is a supporting-point member for pivotal movement of the lever 31. Reference numbers 41, 42, 43 are rollers that abut on outer circumferential portions of the unloaded optical disk in order to center the optical disk, 80 a motor, 50 a switch that turns supply of driving input power to the motor 80 on/off, 21 a transmission for transmitting rotational driving force of the motor 80 to the lever 32, and 22 a lifter provided at the base 11 as the first base in order to change a vertical position of the unit mechanism mounting member 12 by giving pivotal moving force thereto with the optical disk loaded within a desired internal position of the apparatus during disk chucking. Reference numbers 25, 26 are both a supporting point for the unit mechanism mounting member 12 to change its vertical position by its pivotal movement. Meanings of other reference numbers and symbols are the same as for FIG. 1. The unit mechanism mounting member 12 changes in vertical position by pivotal movement about the supporting points 25, 26. The feed motor 60, the lead screw member 71, the guide members 72, 73, and other sections are also arranged with the disk motor 2 and the clamper 3, on the unit mechanism mounting member 12. Therefore, these sections are also moved vertically (i.e., changed in moving position) together with the unit mechanism mounting member 12 by the vertical movement thereof. The transmission 21 is equipped with a gear train. The roller 42 is provided on the lever 31.

In the above construction, the directly-coupled driving type of feed motor 60 is disposed externally to a midpoint position (radial intermediate position on a chucked optical disk or intermediate position between an inside diameter and outside diameter of the optical disk) in a radial direction of the disk in its projection region (i.e., this region is where the optical disk creates a shadow thereof when orthogonally projected in a direction vertical to a disk plane; hereinafter, this region is referred to as the projection region or the disk projection region) on the unit mechanism mounting member 12. That is to say, a position at a distance about half a radial length of a body of the feed motor 60 during its pivotal movement becomes external to the midpoint position in the radial direction of the optical disk. Also, the supporting points 25, 26 are provided on the outer circumferential side of the chucked optical disk, namely, externally to the midpoint position in the radial direction thereof (i.e., the radial intermediate position on the optical disk or the intermediate position between the inside diameter and outside diameter of the disk). In addition, the feed motor 60 is disposed at a position closer to the supporting point 25, 26, than to the midpoint position in the radial direction of the optical disk (i.e., the radial intermediate position on the optical disk or the intermediate position between the inside diameter and outside diameter of the disk), in the projection region of the disk. That is, the position at a distance about half the radial length of the body of the feed motor 60 during its pivotal movement becomes closer to the supporting point 25, 26 than to the midpoint position in the radial direction of the optical disk. Constructing each element in this way is effective for dimensional reduction, especially for reduction in thickness, as described later herein.

In the construction according to FIGS. 1 and 2, when the optical disk is loaded into the apparatus and chucked, the lifter 22 lifts the unit mechanism mounting member 12 that functions as the second base, to a desired position by pivotally moving the member 12 about the supporting points 25, 26. After the optical disk has thus been made to abut on the face of the recess 8c of the top cover 8 that is opposed to the disk, a front edge of the damper 3 protrudes from the through-hole 8b in the top cover 8 and is positioned above at least the outer planar section 8b of the top cover 8, in the projection region of the optical disk. When the unit mechanism mounting member 12 is moved upward, the feed motor 60 also is moved upward from that position (position on the outer circumferential side of the optical disk or position near the supporting point 25, 26), together with the unit mechanism mounting member 12.

When the optical disk is loaded from a loading/unloading slot (not shown) within the front panel into the optical disk apparatus 1, the rollers 41, 42, 43 abut, in that order, upon the outer circumferential portions of the optical disk. The optical disk is then centered while the levers 31, 32, 33 are each changing in position, and is positioned to be approximately concentric with a rotating shaft of the disk motor 4. At this time, the roller 42 is pushed toward an outer circumference of the optical disk, thus turning the lever 31 about a supporting point on the supporting-point member 31a, in a direction of arrow E. The lever 31 activates the switch 50 when a desired amount of turning displacement of the lever 31 in the direction of arrow E is reached. When the switch 50 is activated, desired driving input power is supplied from a driver (not shown) to the motor 80 to rotate this motor. When the motor 80 starts rotating, its rotational driving force is transmitted to the lever 32 by the transmission 21. The lever 32 transfers the transmitted force to the lifter 22. The lifter 22 is thus actuated by the transferred force. The lifter 22 then gives, by, for example, pushing an engaging section of the unit mechanism mounting member 12, pivotal moving force for the member 12 to pivotally move about the supporting point 25, 26. Thus, the unit mechanism mounting member 12 moves upward in a direction of the top cover 9. When the unit mechanism mounting member 12 starts moving upward, the disk motor 2, and the damper 3, and the disk plane support section 2a also start moving upward. Consequently, the convex-shaped damper 3 is inserted into the central hole of the optical disk and the disk plane support section 2a partly abuts the planar section provided around the central hole in the optical disk. In this condition, when the unit mechanism mounting member 12 moves further upward, the optical disk abuts on the face of the recess 8c of the top cover 8 that is opposed to the disk. Repulsion from this opposed face then causes the damper 3 to enter the central hole in the optical disk almost completely, and almost the entire disk plane support section 2a abuts the planar section provided around the central hole in the optical disk. The optical disk is thus chucked by the damper 3 and the disk plane support section 2a. In the chucked state of the disk, the front edge of the damper 3 protrudes from the through-hole 8b in the top cover 8 and is positioned above the outer planar section 8b of the top cover 8, in the disk projection region. When the unit mechanism mounting member 12 is moved upward, the feed motor 60 is also moved upward with the unit mechanism mounting member 12. The driving input power to the feed motor 60 is turned off during the chucking operation mentioned above.

After the chucking operation, on the basis of the driving input power supplied to the motor 80, the lifter 22 moves the unit mechanism mounting member 12 downward by pivotally moving it about the supporting points 25, 26, in a direction reverse to that of the above-mentioned upward movement. Accordingly, the optical disk is spaced apart from the above-mentioned opposed face and moved downward to a desired position. Under the state where the optical disk has been lowered to the desired position, namely, a position at which the disk can be rotated for writing or reading information, the front edge of the damper 3 is positioned below the outer planar section 8b of the top cover 8, in the disk projection region. When the unit mechanism mounting member 12 is moved downward, the feed motor 60 also moves downward with the unit mechanism mounting member 12. In addition, when the optical disk is lowered to the desired position, the driving input power to the feed motor 60 is turned off. This allows rotation of the disk motor 2 and the feed motor 60, and hence, rotational driving of the optical disk by the disk motor 2 and movement of the optical pickup 4 by the feed motor 60. For example, when a driving pulse signal is input as a driving input signal to the feed motor 60, this motor rotates at a desired rotational angle or at a desired speed, thus rotating the lead screw member 71 directly coupled with the motor-rotating shaft. When the lead screw member 71 rotates, the rack 4b previously engaged with the feed screw on the surface of the lead screw member transmits the rotation force thereof to the optical pickup 4 as linear moving force. The optical pickup 4 is then guided along the guide members 72, 73 and moved through a desired distance in approximately the radial direction of the optical disk at the desired speed. While being moved in this way, the optical pickup 4 irradiates the recording surface of the optical disk with a laser beam and writes or reads information.

The same reference numbers as those assigned in FIGS. 1 and 2 are used for the elements of the optical disk apparatus 1 that are described below.

FIG. 3 is a plan view showing the constituent elements of the optical disk apparatus of FIG. 1 that are arranged on the unit mechanism mounting member 12.

In FIG. 3, reference number 100 is the optical disk chucked inside the apparatus by the damper 3 and the disk plane support section 2a, and symbol P-P' is a straight line (hereinafter, referred to as the supporting-point line) passing through the two supporting points 25 and 26. Meanings of other reference numbers and symbols are the same as for FIGS. 1 and 2. When the lifter 22 moves the unit mechanism mounting member 12 vertically with its end portion A as a point of action, the member 12 pivotally moves about the supporting points 25, 26, namely, supporting-point line P-P', in a Z-axial plane. The amount of displacement due to the vertical movement (i.e., the amount of moving displacement) increases as the unit mechanism mounting member 12 moves away from the supporting points 25, 26, namely, supporting-point line P-P'. Symbol Y' denotes a coordinate axis perpendicular to supporting-point line P-P' in an X-Y plane, and X' denotes a coordinate axis perpendicular to Y' in the X-Y plane. In the present invention, the amount of rotational displacement of the feed motor 60 is diminished for dimensional reduction of the apparatus, especially for reduction in its thickness. For this reason, the feed motor 60 is disposed externally to the midpoint position in the radial direction of the optical disk 100 (i.e., the radial intermediate position on the optical disk 100 or the intermediate position between the inside diameter and outside diameter of the disk), in the projection region of the disk in its chucked condition. That is, the position at a distance about half the radial length of the body of the feed motor 60 during its pivotal movement is set externally with respect to the midpoint position in the radial direction of the optical disk. Also, the supporting points 25, 26 are provided on the outer circumferential side of the chucked optical disk 100, namely, externally to the midpoint position in the radial direction of the optical disk (i.e., the radial intermediate position on the optical disk 100 or the intermediate position between the inside diameter and outside diameter of the disk). In addition, the feed motor 60 is disposed at a position closer to the supporting points 25, 26, namely, supporting-point line P-P', than to the midpoint position in the radial direction of the optical disk 100 (i.e., the radial intermediate position on the optical disk 100 or the intermediate position between the inside diameter and outside diameter of the disk), in the above-mentioned projection region of the disk. That is, the position at a distance about half the radial length of the body of the feed motor 60 during its pivotal movement is closer to the supporting points 25, 26 than to the midpoint position in the radial direction of the optical disk. Constructing each element in this way is effective for dimensional reduction, especially for reduction in thickness. In the construction of FIG. 3, the feed motor 60 is disposed so that part thereof is positioned externally to supporting-point line P-P'.

As described above, the construction with the feed motor 60 disposed externally to the optical disk 100 or close to the supporting points 25, 26, in the projection region of the optical disk 100, suppresses an increase in a plane area of the optical disk apparatus, reduces the height of the top cover 8, and enables dimensional reduction of the optical disk apparatus 1, especially, reduction in the thickness thereof. As a result, the construction enables a thickness of the entire optical disk apparatus 1 to be suppressed to, for example, $9.5 \times 10^{-3}$ m or less.

FIG. 4 is a diagram showing a chucked condition of the optical disk 100 in the optical disk apparatus 1 of FIG. 1.

In FIG. 4, reference number 100 denotes the optical disk, $8c_1$ the face of the recess 8c of the top cover 8 that is opposite to the surface of the optical disk 100 (hereinafter, this face is referred to as the outer plane of the recess 8c in the top cover 8), and $8c_2$ the face of the recess 8c of the top cover 8 that is opposed to the optical disk 100 (hereinafter, this face is referred to as the inner plane of the recess 8c in the top cover 8). Reference number 85 denotes the loading/unloading slot for the optical disk 100, provided in the front panel 7. Arrow $F_1$ denotes a direction in which the unit mechanism mounting member 12 pivotally moves upward, arrow $F_2$ denotes a direction in which the unit mechanism mounting member 12 pivotally moves downward, arrow $F_1'$ denotes a direction in which the feed motor 60 pivots to move upward with the unit mechanism mounting member 12, and arrow $F_2'$ denotes a direction in which the feed motor 60 pivots to move downward with the unit mechanism mounting member 12. Symbol $h_1$ denotes a vertical distance from the side (in the disk projection region) of the top cover's outer planar section 8a that faces the supporting points 25, 26, to the front edge of the damper 3, and symbol $h_2$ denotes a vertical distance from the side (in the disk projection region) of the top cover's outer planar section 8a that is formed in a direction opposite to the supporting points 25, 26, namely, the lifter 22, to the front edge of the damper 3; wherein $h_1$=the amount of protrusion of the front edge of the damper 3 from the outer planar section 8a, $h_2$=the amount of protrusion of the front edge of the damper 3 from the outer planar section 8a, and $h_2 > h_1$.

The unit mechanism mounting member 12 is moved further upward by the lifter 22 and the optical disk 100 abuts on the inner plane $8c_2$ of the recess 8c of the top cover 8. Consequent repulsion from the inner plane $8c_2$ causes the damper 3 to enter the central hole in the optical disk 100 almost completely. Also, for instance, almost the entire disk plane support section 2a (not shown in FIG. 3) on the rotating section of the disk motor 2 abuts the planar section provided around the central hole in the optical disk 100. When the optical disk 100 is thus chucked, the front edge of the damper 3 protrudes from the through-hole 8b in the top cover 8, over the outer plane $8c_1$ thereof, and height of the front edge is set to range from $h_1$ to $h_2$, above the outer planar section 8a of the top cover 8, in the disk projection region. After the optical disk 100 has been chucked, the unit mechanism mounting member 12 moves downward in a direction of arrow $F_2$, whereby the damper 3 also moves downward. After moving downward to a desired vertical position, the optical disk 100 becomes rotatable for writing or reading. Along with the construction in which, as described above, the feed motor 60 is disposed on the outer circumferential side of the optical disk 100 or at a position near the supporting points 25, 26, the construction that causes the front edge of the damper 3 to protrude over the vertical position of the outer planar section 8a of the top cover 8 in the above way during disk chucking enables height of the outer planar section 8a of the top cover 8 to be reduced below height of the front edge of the damper 3, and thus reduces the top cover 8 in height. This allows the optical disk apparatus 1 to be dimensionally reduced, especially, in thickness. In the optical disk apparatus 1 having the construction described in FIGS. 1 to 4, for example, when both $h_1$ and $h_2$ are set to be $0.5 \times 10^{-3}$ m or less, the downward movement of the damper 3 after the disk has been chucked allows the front edge of the damper 3 to be positioned below the outer planar section 8a of the top cover 8. As a result, the entire optical disk apparatus 1 can also have its thickness suppressed to $9.5 \times 10^{-3}$ m or less.

FIG. 5 is an explanatory diagram of the amount of pivotal moving displacement of the feed motor 60 during disk chucking in the optical disk apparatus 1 of FIG. 1. In the present embodiment, as shown in FIG. 5, the feed motor 60 is constructed so that its motor-rotating shaft and its external plane are approximately parallel to the plane of the unit mechanism mounting member 12.

In FIG. 5, 60a and 60a' denote the respective volumetric ranges occupied by the feed motor 60 when it is disposed at a distance of $d_1$ from the supporting points 25, 26, or supporting-point line P-P' (i.e., a distance from the supporting points 25, 26, or supporting-point line P-P' to a point of $K_1$ at a position about half the radial length of the body of the feed motor 60 during its pivotal movement). More specifically, 60a denotes the volumetric range occupied by the feed motor 60 when the unit mechanism mounting member 12 does not move upward for disk chucking, and 60a' denotes the volumetric range occupied by the feed motor 60 when the unit mechanism mounting member 12 moves upward for chucking, through an angle of θ, toward the top cover 8. Also, 60b and 60b' denote the respective volumetric ranges occupied by the feed motor 60 when it is disposed at a distance of $d_2$ from the supporting points 25, 26, or supporting-point line P-P' (i.e., a distance from the supporting points 25, 26, or supporting-point line P-P' to a point of $K_2$ at a position about half the radial length of the body of the feed motor 60 during its pivotal movement). More specifically, 60b denotes the volumetric range occupied by the feed motor 60 when the unit mechanism mounting member 12 does not move upward for disk chucking, and 60a' denotes the volumetric range occupied by the feed motor 60 when the unit mechanism mounting member 12 moves upward for chucking, through an angle of θ, toward the top cover 8. In addition, 8a denotes the outer planar section of the top cover 8, 8d the inner planar section thereof, 10a an outer planar section of the bottom cover 10, 10d an inner planar section thereof, $z_a$ the amount of pivotal moving displacement, namely, a difference in the amount of displacement between volumetric ranges 60a, 60a', of the feed motor 60 during upward movement of the unit mechanism mounting member 12 through the angle of θ toward the top cover 8, $z_b$ the amount of pivotal moving displacement, namely, a difference in the amount of displacement between volumetric ranges 60b, 60b', of the feed motor 60 during upward movement of the unit mechanism mounting member 12 through the angle of θ toward the top cover 8, and $F_1$ a direction in which the unit mechanism mounting member 12 moves upward for disk chucking.

Furthermore, symbol "a" denotes a position of the end portion of the unit mechanism mounting member 12 that faces the supporting points 25, 26, "b" a position of the supporting points 25, 26, or of supporting-point line P-P', "c" a position of an outside-diametral portion (outer circumferential portion) of the optical disk 100, and "d" a central position of the rotating shaft of the disk motor 2. Symbol "e" denotes a position of the end portion of the unit mechanism mounting member 12 that faces the point-of-action at which it receives moving force from the lifter 22, "f" a position of an inside-diametral portion (inner circumferential portion) of the optical disk 100, "g" a midpoint position between positions "c" and "d", and "h" a midpoint position between positions "c" and "f". Symbol $A_1$ denotes a region range between positions "c" and "d", and this region range lies externally to the radial midpoint position on the optical disk 100, namely, radial midpoint position "h" between the inside diameter and outside diameter of the optical disk, in the projection region of the disk in its chucked condition. Symbol $A_2$ denotes a region range between positions "c" and "g" and this region range lies externally to the radial midpoint position on the optical disk 100, namely, externally to radial midpoint position "g" on the optical disk, in the projection region of the chucked disk. Point $K_1$ at the distance of $d_1$ lies within range $A_1$ or $A_2$, and point $K_2$ at the distance of $d_2$ lies outside range $A_1$ or $A_2$.

In the present invention, as described above, since the feed motor 60 is disposed at the distance of $d_1$ and thus exists within range $A_1$ or $A_2$, $z_a$ (the amount of pivotal moving displacement of the feed motor 60) is reduced, even when the unit mechanism mounting member 12 moves upward for the chucking of the optical disk 100. This allows the top cover 8 to be reduced in height and thus the apparatus to be dimensionally reduced, especially in thickness. In contrast to the above form of disposition, if the feed motor 60 is disposed at the distance of $d_2$ and thus exists outside range $A_1$ or $A_2$, when the unit mechanism mounting member 12 moves upward in the direction of the top cover 8 in order for the optical disk 100 to be chucked, the amount of pivotal moving displacement of the feed motor 60 is increased to $z_b$, which is about $d_2/d_1$ times as great as $z_a$. This increases the height required of the top cover 8, thus impeding dimensional reduction of the apparatus, especially in thickness.

According to the above-described embodiment of the present invention, the feed motor 60 is provided at an outer circumferential position of the optical disk 100 or a position near the supporting points 25, 26 (or supporting-point line P-P') on the outer circumferential side of the disk, in the projection region thereof. The thickness of the apparatus can thus be further reduced with a suppressed increase of its plane dimensions. Also, the construction that causes the front edge of the damper 3 to protrude from the through-hole 8*b* in the top cover 8 and to be positioned above the outer planar section 8*a* thereof enables desired height of the front edge of the damper 3 to be obtained, even when the outer planar section 8*a* of the top cover 8 is reduced in height. Consequently, the optical disk apparatus 1 can be dimensionally reduced, especially, in thickness, and the optical disk 100 can be reliably chucked.

While, in the above embodiment, the feed motor 60 is constructed so that its motor-rotating shaft and its external plane are approximately parallel to the plane of the unit mechanism mounting member 12, the present invention is not limited to this construction and as shown in FIG. 6, the motor may have its motor-rotating shaft and its external plane inclined to the plane of the unit mechanism mounting member 12.

In FIG. 6, symbol a denotes an inclination angle of the motor-rotating shaft and external plane of the feed motor 60 to the plane of the unit mechanism mounting member 12, and meanings of other symbols are the same as for FIG. 5. Such construction makes it possible to reduce height of the profile section of the feed motor 60 that takes up the highest vertical position when the unit mechanism mounting member 12 moves upward for disk chucking. In terms partly of this feature, it is possible to dimensionally reduce the apparatus, and more particularly, to further reduce its thickness.

A slot-in type of optical disk apparatus has been described in the above embodiment. However, this does not limit the present invention.

Without departing from its major features, the present invention can likewise be embodied in modes other than the above form. In all respects, therefore, the above embodiment is merely an example of the invention and is not to be understood in limited fashion. The scope of the invention is specified by claims. Additionally, all modifications and changes belonging to equivalents of the claims are within the scope of the invention.

What is claimed is:

1. An optical disk apparatus of a slot-in type for writing or reading information by moving an optical pickup in approximately a radial direction of an optical disk, said apparatus comprising:
    a lead screw member having a feed screw which applies an approximately radial moving force to said optical pickup in said radial direction of said optical pickup by rotating;
    a disk motor for drivingly rotating said optical disk in a chucked condition thereof;
    a feed motor disposed at a position external to a midpoint position in a radial direction of said chucked optical disk, said position of said feed motor being in a vicinity of a slot of a front panel of said apparatus through which said optical disk is directly loaded and unloaded without a tray and in a projection region of said optical disk, said feed motor being directly-coupled to said lead screw member so as to drivingly rotate said lead screw member;
    a first base as an apparatus base;
    a second base on which said lead screw member, said feed motor, and said optical pickup are mounted, wherein said second base pivotally moves about at least one supporting point disposed more externally relative to a midpoint position in said radial direction of said chucked optical disk; and
    a lifter provided on a side of said second base facing said first base;
    wherein, when said optical disk is chucked, said optical disk is loaded into a desired internal position of said apparatus and then said lifter moves said second base about said at least one supporting point by applying a pivotal moving force to said second base.

2. The optical disk apparatus according to claim 1, wherein said feed motor is installed with a rotating shaft thereof inclined to a plane of said second base.

3. The optical disk apparatus according to claim 1, wherein said feed motor is disposed at a position which is closer to said slot of said front panel of said apparatus than to a center of said chucked optical disk.

4. An optical disk apparatus of a slot-in type for writing or reading information by moving an optical pickup in approximately a radial direction of an optical disk, said apparatus comprising:
    a lead screw member having a feed screw which applies an approximately radial moving force to said optical pickup in said radial direction of said optical pickup by rotating;
    a feed motor directly-coupled to said lead screw member for rotationally driving said lead screw member;
    a disk motor for drivingly rotate the optical disk in a chucked condition;
    a first base as an apparatus base;
    a second base on which said lead screw member, said feed motor, said optical pickup, and said disk motor are mounted, wherein said second base is adapted to pivotally move about at least one supporting point disposed more externally relative to a midpoint position in a radial direction of said chucked optical disk, and wherein said feed motor is disposed at a position closer to said supporting point than to said midpoint position in said radial direction of said optical disk, said position of said feed motor being in a vicinity of a slot of a front panel of said apparatus through which said optical disk is directly loaded and unloaded without a tray and in a projection region thereof; and a lifter provided on a side of said second base facing said first base;

wherein, when said optical disk is chucked, said optical disk is loaded into a desired internal position of said apparatus and then said lifter moves said second base about said supporting point by applying a pivotal moving force to said second base.

5. The optical disk apparatus according to claim 4, wherein said feed motor is installed with a rotating shaft inclined to a plane of said second base.

6. The optical disk apparatus according to claim 4, wherein said feed motor is disposed at a position which is closer to said slot of said front panel of said apparatus than to a center of said chucked optical disk.

7. An optical disk apparatus of a slot-in type that writes or reads information by rotating an optical disk in a concentrically chucked condition on a rotating shaft of a disk motor and moving an optical pickup in approximately a radial direction of said optical disk, said apparatus comprising:

a convex-shaped clamper disposed on a rotating section of said disk motor, wherein, when said optical disk is chucked, said clamper is inserted into a central hole of said optical disk and supports said optical disk in a radial direction;

a disk plane support section disposed concentrically with said convex-shaped clamper, on said rotating section of said disk motor, wherein, with said convex-shaped clamper inserted within said central hole of the optical disk, said support section supports a planar section of said optical disk;

a top cover of said apparatus disposed above said clamper, wherein said top cover has a through-hole at a position opposed to said clamper and covers a top surface side of said apparatus;

a bottom cover that covers a bottom side of said apparatus;

a lead screw member having a feed screw which applies an approximately radial moving force to said optical pickup in said radial direction of said optical pickup by rotating;

a feed motor directly-coupled to said lead screw member and disposed at a position external to a midpoint position in said radial direction of said chucked optical disk, said position of said feed motor being in a vicinity of a slot of a front panel of said apparatus through which said optical disk is directly loaded and unloaded without a tray and in a projection region thereof, wherein said feed motor rotationally drives said lead screw member;

a disk motor for rotationally driving said optical disk in its chucked condition;

a first base as an apparatus base;

a second base coupled with said bottom cover, wherein said lead screw member, said feed motor, said optical pickup, said disk motor, and said convex-shaped clamper are mounted on said second base, and wherein said second base pivotally moves about at least one supporting point disposed more externally relative to a midpoint position in said radial direction of said chucked optical disk; and a lifter provided on a side of said second base facing said first base, wherein, when said optical disk is chucked, said optical disk is loaded into a desired internal position of said apparatus and then said lifter moves said second base about said at least one supporting point by applying a pivotal moving force to said second base;

wherein, during the chucking of said optical disk, said lifter moves said second base upward and then after said optical disk has been made to abut on an opposite face of said top cover, a front edge of said convex-shaped clamper protrudes from said through-hole in said top cover and is positioned higher than an outside surface of said top cover in said disk projection region.

8. The optical disk apparatus according to claim 7, wherein said feed motor is installed with a rotating shaft thereof inclined to a plane of said second base.

9. The optical disk apparatus according to claim 7, wherein a maximum distance between said outer surface of said top cover and an outer surface of said bottom cover is $9.5 \times 10^{-3}$ m.

10. The optical disk apparatus according to claim 7, wherein said feed motor is disposed at a position which is closer to said slot of said front panel of said apparatus than to a center of said chucked optical disk.

* * * * *